United States Patent
Ehlers et al.

(10) Patent No.: US 9,540,108 B2
(45) Date of Patent: Jan. 10, 2017

(54) SPACE-OPTIMIZED CABIN ATTENDANT STANDING SEAT FOR AIRCRAFT

(71) Applicant: Airbus Operations GmbH, Hamburg (DE)

(72) Inventors: Bernd Ehlers, Hamburg (DE); Simon Maurer, Metzingen (DE); Arne Hardt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 234 days.

(21) Appl. No.: 13/912,512

(22) Filed: Jun. 7, 2013

(65) Prior Publication Data

US 2013/0313365 A1   Nov. 28, 2013

Related U.S. Application Data

(63) Continuation of application No. PCT/EP2011/072349, filed on Dec. 9, 2011.

(60) Provisional application No. 61/424,315, filed on Dec. 17, 2010.

(30) Foreign Application Priority Data

Dec. 17, 2010   (DE) .......................... 10 2010 054 942

(51) Int. Cl.
*B64D 11/06* (2006.01)

(52) U.S. Cl.
CPC ............ *B64D 11/06* (2013.01); *B64D 11/062* (2014.12); *B64D 11/0611* (2014.12); *B64D 11/0691* (2014.12); *B64D 11/0698* (2014.12)

(58) Field of Classification Search
None
See application file for complete search history.

(56) References Cited

U.S. PATENT DOCUMENTS

| 3,594,037 | A | * | 7/1971 | Sherman | ................ A47C 1/036 297/14 |
| 3,898,704 | A | * | 8/1975 | Gallaher | .............. A47C 19/205 244/118.6 |
| 4,619,623 | A | * | 10/1986 | Elverskog | .............. B64D 11/06 441/123 |
| 4,799,632 | A | | 1/1989 | Baymak et al. | |

(Continued)

FOREIGN PATENT DOCUMENTS

| CN | 201230731 Y | 5/2009 |
| DE | 10008258 A1 | 9/2001 |

(Continued)

OTHER PUBLICATIONS

International Searching Authority, International Search Report dated Apr. 12, 2012 for International Application No. PCT/EP2011/072349.

(Continued)

*Primary Examiner* — Medhat Badawi
(74) *Attorney, Agent, or Firm* — Lorenz & Kopf, LLP

(57) ABSTRACT

An aircraft comprising a space-optimized standing seat for cabin attendants in a passenger cabin is provided. The aircraft comprises a cabin attendant seat and a cabin with an aircraft exit. The cabin attendant seat comprises a seating area and a backrest and is arranged in the region of the aircraft exit. Therein, the cabin attendant seat is designed as a standing seat.

11 Claims, 4 Drawing Sheets

(56) References Cited

U.S. PATENT DOCUMENTS

| | | | | |
|---|---|---|---|---|
| 5,328,239 A | * | 7/1994 | Yamazaki | A47C 7/56 297/333 |
| 5,342,109 A | * | 8/1994 | Berry | B63C 9/28 297/188.03 |
| 5,660,433 A | * | 8/1997 | Bruhnke | B60N 2/4613 224/281 |
| 5,813,715 A | * | 9/1998 | Musukula | B60N 2/0224 296/63 |
| 5,829,836 A | * | 11/1998 | Schumacher | B64D 11/0693 244/118.6 |
| 5,848,820 A | * | 12/1998 | Hecht | B60N 2/3013 297/113 |
| 6,007,025 A | * | 12/1999 | Coughren | B64D 11/02 105/329.1 |
| 6,467,728 B2 | * | 10/2002 | Angerami | B60N 2/24 244/118.5 |
| 7,100,991 B2 | * | 9/2006 | Schroth | B60N 2/24 280/748 |
| 7,140,679 B2 | * | 11/2006 | Atherley | B60N 2/24 180/219 |
| 7,252,336 B2 | * | 8/2007 | Frisina | B60N 2/1695 297/118 |
| 7,413,247 B2 | * | 8/2008 | Van Druff | B60N 2/4242 297/216.17 |
| 7,490,906 B2 | | 2/2009 | Schumacher et al. | |
| 7,523,993 B1 | * | 4/2009 | Daneault | B60N 2/242 244/118.5 |
| 7,798,446 B2 | | 9/2010 | Park | |
| 8,152,101 B2 | * | 4/2012 | Law | B64D 11/06 244/118.5 |
| 8,336,961 B2 | * | 12/2012 | Zeimis, III | B60N 2/0292 296/65.09 |
| 8,403,410 B1 | * | 3/2013 | Pinger | B60N 2/643 297/188.05 |
| 8,556,343 B2 | * | 10/2013 | Rubinshteyn | A47C 31/113 297/219.12 |
| 2002/0000490 A1 | * | 1/2002 | Angerami | B60N 2/24 244/118.5 |
| 2004/0195450 A1 | * | 10/2004 | Hiesener | B64D 11/00 244/118.5 |
| 2004/0227390 A1 | | 11/2004 | Schroth | |
| 2005/0264058 A1 | * | 12/2005 | Schumacher | A47C 1/023 297/232 |
| 2006/0267367 A1 | * | 11/2006 | Burgess | B60N 2/01 296/68.1 |
| 2007/0273192 A1 | * | 11/2007 | Van Druff | B60N 2/4242 297/339 |
| 2010/0001568 A1 | * | 1/2010 | Trybus | B60N 2/1835 297/312 |
| 2011/0226891 A1 | * | 9/2011 | Tran | B64C 39/026 244/16 |
| 2013/0313365 A1 | * | 11/2013 | Ehlers | B64D 11/06 244/118.6 |

FOREIGN PATENT DOCUMENTS

| | | |
|---|---|---|
| DE | 102005009750 A1 | 9/2006 |
| JP | 08131295 A | 5/1996 |
| JP | 10157566 A | 6/1998 |
| WO | 8504146 A1 | 9/1985 |

OTHER PUBLICATIONS

International Searching Authority, Written Opinion dated Apr. 12, 2012 for International Application No. PCT/EP2011/072349.

State Intellectual Property Office of the People's Republic of China, Chinese Office Action lated Jul. 1, 2016 for Chinese Patent Application No. 2011800605013.

* cited by examiner

SPACE-OPTIMIZED CABIN ATTENDANT STANDING SEAT FOR AIRCRAFT

CROSS REFERENCE TO RELATED APPLICATIONS

This is a continuation of International Application No. PCT/EP2011/072349, filed Dec. 9, 2011, which application claims priority to German Patent Application No. 10 2010 054 942.8, filed Dec. 17, 2010 and to U.S. Provisional Patent Application No. 61/424,315, filed Dec. 17, 2010, which are each incorporated herein by reference in their entirety.

TECHNICAL FIELD

The technical field relates to an aircraft with a cabin attendant seat that is designed as a standing seat. Furthermore, the technical field relates to the use of a standing seat as a cabin attendant seat in an aircraft, in particular in an airplane.

BACKGROUND

In aircraft, for example in airplanes for transport of passengers, cabin attendants, for example stewardesses and stewards, may be present on board who may assist in ensuring flight comfort and safety of passengers. At least during the take-off and landing phases the cabin attendants, too, need to take up positions that meet certain safety requirements.

To this effect flight attendant seats, also known as cabin attendant seats (CASs) are provided that are designed as folding seats. Folding seats are, for example, known from DE 10 2004 025 980 A1 and US 2005/264058 A1. The folding seats may be folded in when they are not in use. The folding seats must be arranged in such a manner that, for example, any jamming of the seat surface cannot prevent unimpeded access to an exit in the case of evacuation.

In addition, other objects, desirable features and characteristics will become apparent from the subsequent summary and detailed description, and the appended claims, taken in conjunction with the accompanying drawings and this background.

SUMMARY

Accordingly, there may thus be a need for improved positioning options for flight personnel, in particular relating to space requirements and safety.

According to one aspect of the present disclosure, an aircraft is described that comprises a cabin with an aircraft exit and a cabin attendant seat. Therein, the cabin attendant seat comprises a seating area and a backrest and is arranged in the region of the aircraft exit. In this arrangement the cabin attendant seat is designed as a standing seat.

In other words, the idea of the present disclosure is based on providing a space-optimized standing seat for cabin attendants in an aircraft. Therein, the standing seat for cabin attendants is designed in such a manner that all the requirements of a cabin attendant seat, for example the arrangement of emergency equipment within reach for fast deployment, as well as seat belt fastening possibilities, are met, and that said standing seat furthermore provides additional advantages when compared, for example, to folding seats.

For example, with the use of a standing seat as a cabin attendant seat it is possible to save space both in the X-direction and in the Y-direction, in other words in the direction horizontally to the floor and in the direction perpendicularly to the floor. Consequently it is possible, for example, to integrate a further seat row for passengers. The use of a stand-up seat as a cabin attendant seat in the entry or exit region is associated with a further advantage in that a cabin attendant may be in position more quickly because s/he is positioned on the standing seat rather in a standing position than in a seated position, which during an evacuation may be very helpful. There is a further advantage, for example when compared to a folding seat as a cabin attendant seat, in that the cabin attendant has a higher seated position, which may provide them with a better overview, for example during take-off and landing. A certain overview during take-off and landing is prescribed by law. This regulation may be met well by the standing seat for cabin attendants as a result of its higher position. When compared to a folding seat the standing seat as a cabin attendant seat provides further advantages. For one thing it requires less space; furthermore, no folding mechanism is required, which renders the cabin attendant seat less maintenance-intensive. Furthermore, the standing seat for cabin attendants may be adjusted to various statures and body heights significantly more easily than is the case with a folding seat.

Furthermore, the use of a standing seat as a cabin attendant seat has advantages when compared to passenger standing seats. Standing seats for passengers are perceived to be uncomfortable because as a rule passengers need to remain on the standing seat for at least two hours. In contrast to this, cabin attendants usually assume their seated positions only during take-off and landing. For this purpose a cabin-attendant standing seat may be perfectly adequate. Furthermore, space savings resulting from attendant seats may be perfectly sensible because as a result of this a further comfortable seat row for passengers, or more space between the individual passenger seat rows, may be provided.

According to one aspect of the present disclosure, the use of a standing seat as a cabin attendant seat in an aircraft is described.

Below, features, details and possible advantages of a device according to various exemplary embodiments of the present disclosure are discussed in detail.

The aircraft may, for example, be designed as an airplane, in particular as a passenger plane. The airplane comprises a cabin that comprises at least one or several aircraft exits, for example airplane exits or cabin exits. The airplane exits may be designed as doors and as emergency exits.

The seat surface of the cabin attendant seat may, for example, comprise a forward inclination. In other words the seating area may, for example, be inclined towards the horizontal, for example towards the floor of the cabin. Therein, the seat surface of the cabin attendant seat is designed in such a manner that a person such as the cabin attendant may rest their bottom against the seating area in such a manner that some of their body weight is supported by said seating area. The backrest may comprise a frame that, for example, may be affixed to a wall, for example a partition wall, or alternatively or in addition may be fastened or affixed to the floor of the cabin. If the standing seat is arranged on a wall, the wall together with the frame may act as a backrest. Both the seating area and the backrest may, for example, comprise cushions.

The seating area may, for example, be a planar surface which is inclined relative to a horizontal, for example relative to the cabin floor. Furthermore, the seating area may be the surface or top of a seat cushion which in section view is oval, triangular or rectangular.

The cabin attendant seat is arranged in the region of the aircraft exit. In other words the cabin attendant seat is in direct proximity to the entry and exit region. For example, the cabin attendant seat may be directly arranged at the door. To this effect the seat back may be flush with the frame of the door or with a frame of an emergency exit so that the cabin attendant seat without a cabin attendant seated thereon makes it possible to gain unimpeded access to the aircraft exit and at the same time is located at the shortest-possible distance from the aircraft exit. For example, an edge of the seating area, which edge is positioned closest to the door frame, may be at a distance of about max. 20 cm, for example, about max. 10 cm, or about max. 3 cm from the door frame.

The cabin attendant seat is designed as a standing seat. The term "standing seat" implies that the seated position of a person using it is higher than the seated position of a person seated on a conventional seat. The standing seat furthermore makes it possible to assume a seated position or standing position in which, for example, the legs of the person seated thereon are more outstretched than is the case with a conventional seat. In conventional seats, the lower leg and the upper leg are usually positioned at an angle of 90°. Furthermore, in conventional seats the upper part of the body and the upper leg are usually also positioned at an angle of 90°. In the case of standing seats the aforesaid two angles are more than about 90° and less than about 180°. In one example, the angle between the lower leg and the upper leg of a person seated on the standing seat is between about 100° and about 170°. To this effect a ratio of a seat height to an inclination of the seating area may be selected in such a manner that the legs of a cabin attendant using the standing seat are not stretched, nor do they form a 90° angle between the upper leg and the lower leg. For example, the seating area of the standing seat may be inclined relative to the backrest of the standing seat in such a manner that the angle enclosed between the backrest and the seat surface is greater than about 90°. The greater the angle between the upper leg and the lower leg, the more outstretched are thus the legs of a cabin attendant, and the less space said cabin attendant takes up in the horizontal, (i.e. in his/her direction of view).

According to an exemplary embodiment of the present disclosure, the cabin attendant seat is arranged relative to the aircraft exit in such a manner that the aircraft exit is readily accessible when the cabin attendant seat is free, i.e. unoccupied.

Consequently the cabin attendant seat may be arranged as near as possible to the aircraft exit so that there may be room for additional passenger rows, and at the same time the door or the emergency exit is readily accessible in the case of an emergency, for example for evacuation.

According to another exemplary embodiment of the present disclosure, the aircraft furthermore comprises a plurality of passenger seats. Therein, the cabin attendant seat provides a higher seat position than is the case with the passenger seats.

Consequently a cabin attendant seated on the standing seat may, for example during take-off and landing, maintain any legally prescribed overview. A higher seat position may denote that the head of the cabin attendant or the viewing height of the cabin attendant is higher than that of the passengers. To this effect the seating area of the standing seat is arranged so as to be higher than the seating area of the passenger seats, which are, for example, designed as conventional seats with an angle of approximately 90° between the seat back and the seating area. Passenger seats may be grouped, for example in seat rows or seat groups.

According to another exemplary embodiment of the present disclosure, the seating area is height-adjustable relative to the backrest of the standing seat.

This means that a distance between the seating area and the backrest is variable. For example, the seat may be displaced while maintaining the same angle relative to the backrest, or alternatively with a variable angle relative to the backrest. For example, the backrest may be firmly connected to the aircraft cabin, for example on a wall and/or on the cabin floor. The seating area may be designed so as to be movable or height-adjustable relative to the backrest. To this effect for example a rail may be provided which is firmly connected to the backrest or to a frame of the backrest, and with the seating area being movably mounted on said rail.

As an alternative the seating area may be firmly connected to the backrest so that the distance of a lower edge of the backrest comprises a fixed distance to the upper edge of the seating area. This distance may be constant and may, for example, be between 0 cm and about 20 cm. In this embodiment both the seating area and the backrest may be movably mounted on one or several rails. Consequently the seat height of the standing seat for cabin attendants may be adjusted to different statures of the cabin attendants.

According to another exemplary embodiment of the present disclosure, the seating area encompasses an angle with the backrest. Therein, this angle is variable by way of a joint.

The angle between the seating area and the backrest is generally greater than about 90°. In one example, this angle is greater than about 100°. The joint may, for example, be a hinge between the seating area and the backrest. As an alternative, the articulated joint may be arranged between a rail on the frame of the standing seat and the seating area. In addition or as an alternative to height adjustment, by varying the angle the seat height may be adapted to different statures. Furthermore, in this manner the standing seat may be made more comfortable, depending on the physical constitution and preferences of the user.

According to another exemplary embodiment of the present disclosure, the cabin comprises a cabin floor. Therein, the seating area is inclined relative to the cabin floor.

This means that the seating area is not parallel to the cabin floor. Therein, for example an angle $\alpha$ between the seating area and the backrest is greater than about 90° so that the legs of a cabin attendant seated thereon are not stretched, nor do they form a 90° angle between the upper leg and the lower leg. The backrest may, for example, be positioned so as to be perpendicular to the cabin floor. An angle of inclination $\beta$ between the cabin floor and the seating area may, for example, be between about 20° and about 80°, in one example, between about 30° and about 70°, and in another example, between about 40° and about 60°. Therein, the angle $\alpha$ between the seating area and the backrest is about 90° greater than the angle $\beta$. The inclination of the seating area makes it possible to stretch one's legs more when seated on the standing seat than when seated on a conventional seat. This makes it possible for the cabin attendant to get up more quickly in the case of an emergency.

According to one exemplary embodiment of the present disclosure, the standing seat further comprises a frame. Therein, the frame is designed to connect the seating area and the backrest. Furthermore, the frame is attachable to the cabin.

The frame may comprise a material, such as metal or plastic. The frame may be designed to transmit forces that act on the standing seat to the cabin. The frame may comprise attachment elements that are designed to attach the frame to a wall, for example to a partition wall. As an alternative the cabin-attendant standing seat may be designed as a standalone seat. To this effect, for example, the frame of the standing seat may be fastened to the cabin floor. A standalone cabin-attendant standing seat may be used more flexibly and does not depend on the position of a wall or of a partition wall in the aircraft cabin.

According to one exemplary embodiment of the present disclosure, the cabin comprises a partition wall. Therein, the partition wall is arranged in the region of the aircraft exit. The backrest of the standing seat is arranged at the partition wall.

Therein, for example, part of the partition wall may act as a backrest in that a frame of the backrest comprises a recess so that the cabin attendant may lean against the partition wall. As an alternative a back cushion is arranged on the frame of the backrest, which back cushion may be supported by the partition wall. By arranging the standing seat on the partition wall the stability or loading capacity of the cabin-attendant standing seat is improved.

According to another exemplary embodiment of the present disclosure, the backrest of the cabin-attendant standing seat comprises a first stowage space for emergency elements.

Therein, the stowage space may, for example, be designed as a recess. Furthermore, the stowage space may be designed as a lockable hollow space. The stowage space may be directly integrated in the backrest, for example in a cushion, or it may be arranged between the backrest and a partition wall. The arrangement of emergency elements at a cabin attendant seat may be prescribed by law. The term "emergency element" may, for example, refer to an oxygen mask that is connected to an oxygen tank. Furthermore, the term "emergency element" may refer to a torch, a fire extinguisher, a first-aid kit or to an emergency axe. Furthermore, it may be prescribed that demonstration equipment for carrying out a presentation during take-off be carried along within easy reach of the cabin attendant. The design of the cabin-attendant standing seat with a stowage space makes it possible to meet legal provisions, namely the accommodation of emergency elements directly at the cabin attendant seat or within easy reach of the cabin attendant.

According to one exemplary embodiment of the present disclosure, the standing seat comprises a second stowage space. Therein, the second stowage space is arranged between the backrest and the seating area.

The second stowage space may, for example, be a space between the seating area and the backrest, which space is not closed off from all sides and comprises retaining elements. For example, engagement elements for receiving emergency elements, for example a fire extinguisher, may be provided. In addition a cover panel between the backrest and the seating area above the second stowage space may be provided, which cover panel is suitable for quick removal. In addition a third stowage space under the seating area, for example comprising further retaining elements, may be provided on the partition wall.

According to another exemplary embodiment of the present disclosure, the aircraft comprises a further cabin attendant seat. The further cabin attendant seat is also designed as a standing seat and forms a unit with the cabin attendant seat.

For example, the first and the second cabin attendant seat form a seat group. Furthermore, a third seat may be provided so that three seats form a seat group for cabin attendants. A unit of cabin attendant seats may facilitate the installation of the standing seats.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
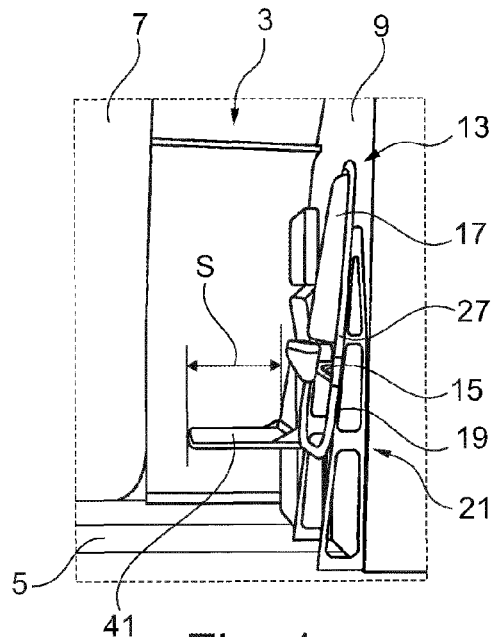
FIG. 1 shows a lateral perspective view of a cabin-attendant standing seat according to an exemplary embodiment of the present disclosure beside a folding seat.
Figure 2:
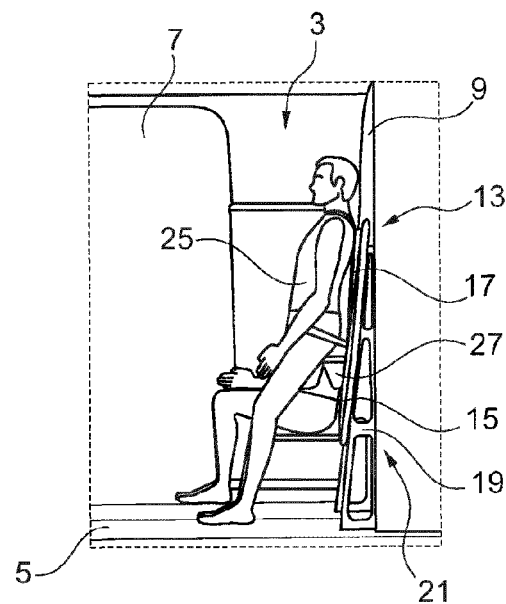
FIG. 2 shows cabin attendants seated on the seats shown in FIG. 1.
Figure 3:
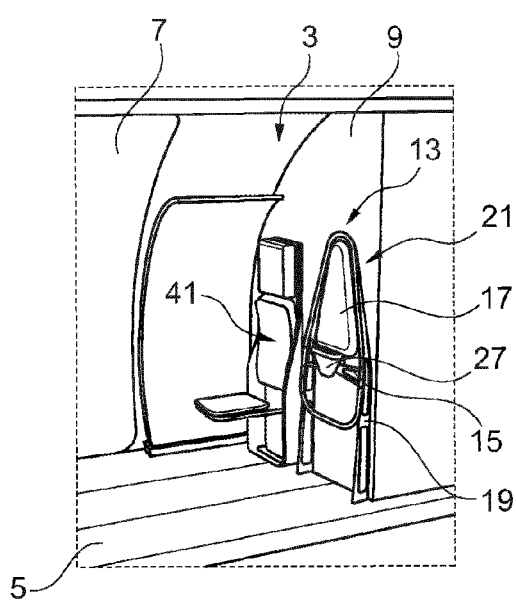
FIG. 3 shows a perspective front view of the seats shown in FIG. 1.
Figure 4:
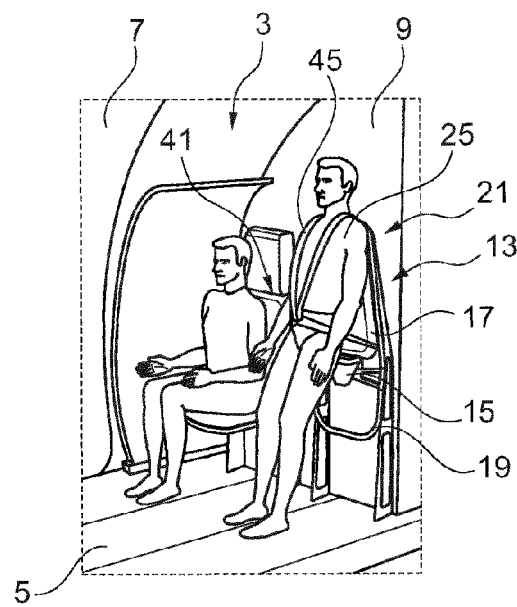
FIG. 4 shows cabin attendants seated on the seats shown in FIG. 3.

The following detailed description is merely exemplary in nature and is not intended to limit the present disclosure or the application and uses of the present disclosure. Furthermore, there is no intention to be bound by any theory presented in the preceding background or the following detailed description.

FIG. 1 to FIG. 4 each shows a comparison of different cabin attendant seats 13. Therein, in each case one cabin attendant seat is shown as a folding seat 41 and one as a standing seat 21 from different perspectives with and without a cabin attendant 25. The cabin attendant seats 13 are arranged in an entrance or exit region near an aircraft exit 7, for example a door or an emergency exit of an aircraft 1, in particular of an airplane.

Up to now seats for cabin attendants in an aircraft cabin 3 have been designed as folding seats 41 as shown in FIGS. 1 to 4 in the rear region of the illustration. Usually, these seats are only used during the take-off and landing phases; most of the time they are in their folded-in state as shown in FIG. 1. Due to their folding function the folding seats 41 comprise quite a complex design. According to regulations, for example certification requirements, seats must not project into the region of door openings or emergency exit openings, because any jamming of the seating area of a folding seat 41 in the case of a crash or in the case of an emergency, where evacuation is required, prevents unimpeded access to the aircraft exit 7. Consequently the space requirement of a folding seat 41 is relatively large, although it is only rarely used. Furthermore, regulations may require the arrangement of cabin attendant seats 13 in the entrance or exit region so that cabin attendants may assist in any possible evacuation.

In FIG. 1 the arrow s shows the additional space required by a folding seat 41 when compared to that of a cabin-attendant standing seat 21. The design of the cabin attendant seat 13 as a standing seat 21 makes it possible, for example, to save approximately 290 mm of space. In combination with other optimization measures this may make it possible to install additional passenger seats 23 or passenger seat rows in the aircraft 1.

As shown in FIGS. 1 to 4, the design of the cabin attendant seat 13 as a standing seat 21 requires less space. This means that the space-optimized standing seat 21 may save space both in the X-direction and in the Y-direction. In other words, in horizontal direction the standing seat 21 may be placed closer to the aircraft exit 7 by the distance s when compared with a folding seat 41. Furthermore, the standing seat 21 may also take up less space in vertical direction so that, for example, it becomes possible to place objects, for example emergency elements, underneath the seat. A further advantage of the space-optimized standing seat 21 comprises the possibility of providing a high seat position so that during take-off and landing phases a cabin attendant 25 may not only maintain a good overview of the cabin 3 and the passengers situated therein, but may also be quickly in position to assist during any evacuation.

The standing seat 21 according to the present disclosure for cabin attendants makes it possible for a crew member in the take-off and landing phases to be seated and to buckle up, for example by means of a belt 45. Therein, the belt may, for example, be a four-point belt. The space requirement of the standing seat 21 is less than is the case with conventional folding seats 41. Furthermore, no complex folding mechanism is required.

FIGS. 1 to 8 show in detail the design of the cabin attendant seat 13 as a standing seat 21. The cabin-attendant standing seat 21 is arranged in the cabin 3 of the aircraft 1 in close proximity to the aircraft exit 7. The standing seat 21 may be attached to the cabin floor 5 and/or to a partition wall 9. Attachment may, for example, take place by means of a frame 19. The standing seat 21 comprises a seating area 15 and a backrest 17. The backrest 17 and the seating area 15 may be interconnected by means of the frame 19.

Figure 11:
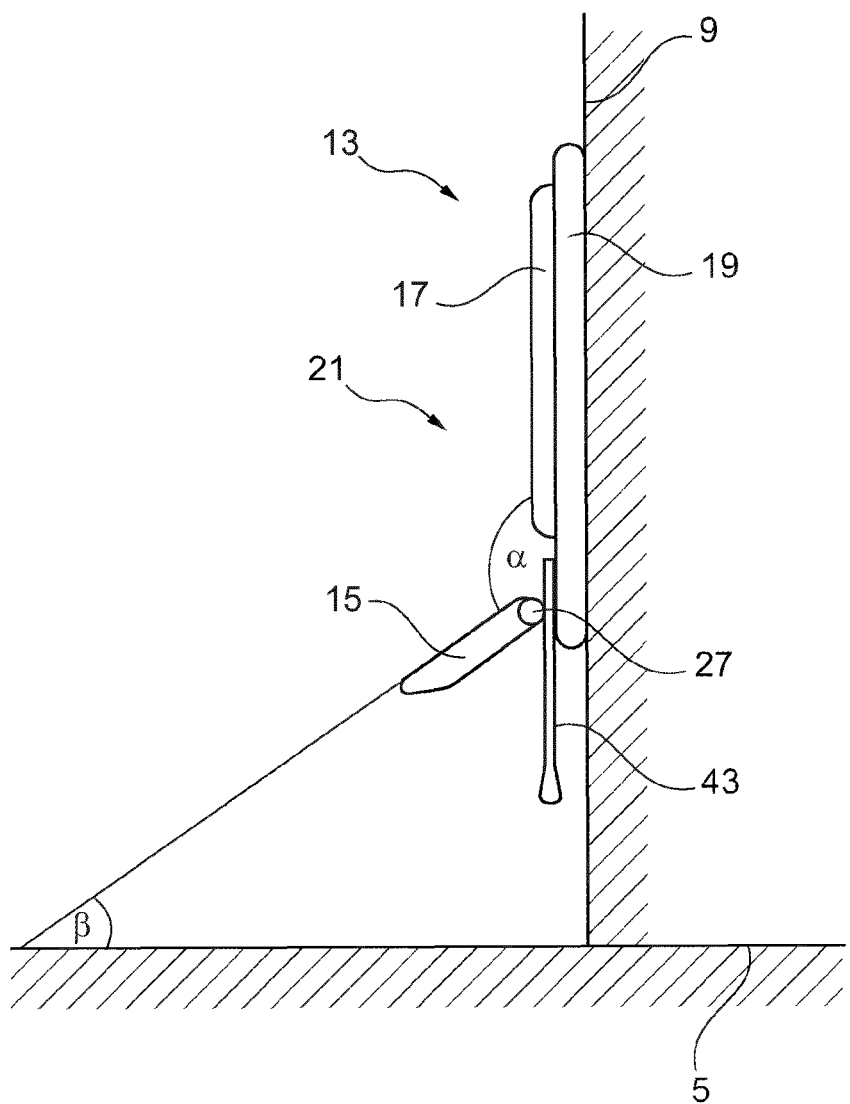
FIG. 11 shows a lateral cross section of a cabin-attendant standing seat according to an exemplary embodiment the present disclosure.

As shown for example in FIG. 11, furthermore, a rail 43 may be provided on the standing seat 21, which rail makes it possible to adjust the height of the standing seat 21. To this effect it may be possible, for example, to move the seating area 15 on the rail 43. As an alternative, embodiments are possible in which the backrest is moved along the rail 43. Furthermore, between the seating area 15 and the backrest 17 or the rail 43 a joint 27 may be provided that makes it possible to adjust an angle α between the backrest 17 and the seating area 15. Therein, the angle α may, for example, be between about 90° and about 180°. In order to set a particular angle α a locking element may be provided on the joint 27. Therein, the relation of the inclination of the seating area to the seat height may be adjusted in such a manner that the legs of the particular cabin assistant 25 are not stretched, nor do they form a 90° angle between the upper leg and the lower leg. As shown in FIG. 11, the seating area 15 is inclined relative to the cabin floor 5 by an angle of inclination β.

Figure 5:
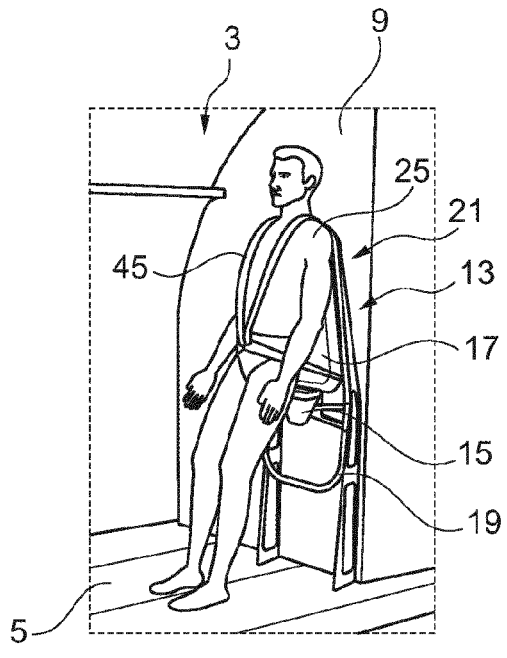
FIG. 5 shows a male cabin attendant seated on a cabin-attendant standing seat according to an exemplary embodiment of the present disclosure.
Figure 6:
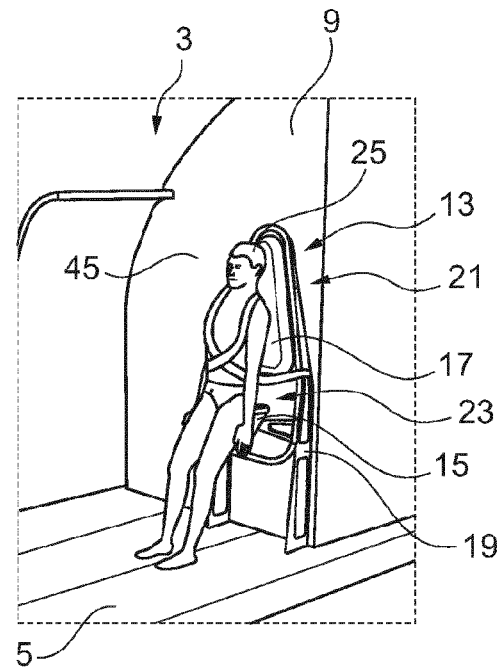
FIG. 6 shows a female cabin attendant seated on a cabin-attendant standing seat according to an exemplary embodiment of the present disclosure.

FIGS. 5 and 6 show how the cabin-attendant standing seat 21 may be adjusted to various statures of cabin attendants 25. To this effect it is possible, for example, to slide the seating area 15 along the frame 19 or along a rail 43. FIG. 5 shows a male cabin attendant of relatively tall stature. Therein, the seating area 15 is at a relatively large distance from the cabin floor 5 and adjoins the backrest 17. In contrast to this, FIG. 6 shows a female cabin attendant 25 who is of shorter stature. Therein, the seating area 15 is located somewhat closer to the cabin floor 5 than is the case in FIG. 6. Therein, the seating area 15 is arranged further away from the backrest 17 than is the case in FIG. 5. As a result of the seat-height adjustment it is, for example, possible for the cabin attendant 25 to attain a comfortable seated position or standing position irrespective of their stature. Furthermore, in this manner it is possible, for example, for the space requirement of different cabin attendants 25 on the standing seat 21 in horizontal direction to remain approximately the same, because the angle between the lower leg and the upper leg of the cabin attendant 25 may remain approximately the same irrespective of stature.

Figure 7:
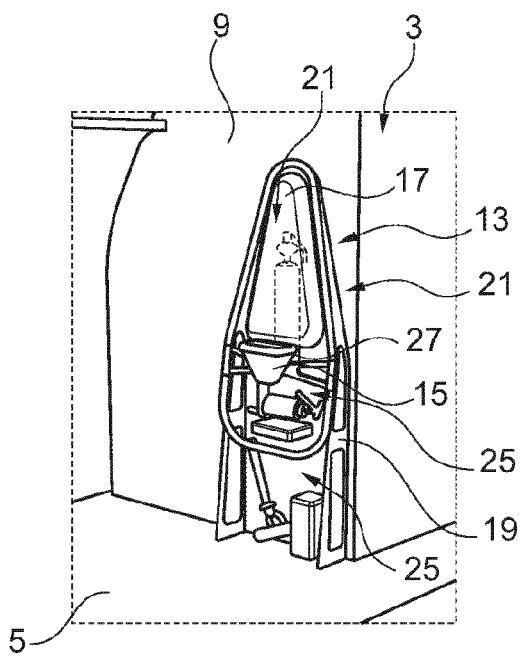
FIG. 7 shows an exemplary embodiment of the cabin-attendant standing seat according to the present disclosure with the backrest shown so as to be transparent.
Figure 8:
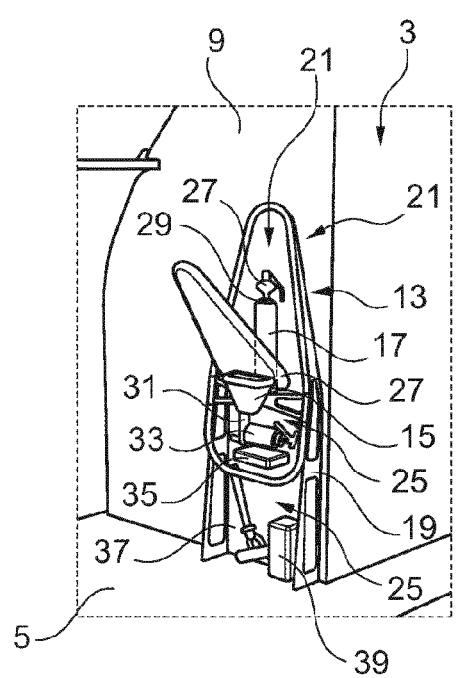
FIG. 8 shows an exemplary embodiment with a folded-forward backrest and a stowage space for emergency elements.

FIGS. 7 and 8 show a first stowage space 21 and a third stowage space 25 at the cabin-attendant standing seat 2. Furthermore, FIG. 6 shows a second stowage space 23. In FIG. 7 the back cushion of the backrest 17 is shown so as to be transparent so that the first stowage space 21 in the backrest 17 is visible. FIG. 8 shows the backrest 17 in a folded-forward position. For this purpose it is possible, for example, to provide a further joint on which the backrest 17 may pivot. In the first stowage space 21, which may be arranged in the backrest 17 or between a cushion of the backrest 17 and of the partition wall 9, emergency elements, as for example an oxygen mask 27 and an oxygen tank 29, may be arranged. In a second stowage space 23 or in a third stowage space 25 further emergency elements may be provided, as for example a torch 31, a fire extinguisher 33, a first-aid box 35 or first-aid kit, and an emergency axe 37. Furthermore, in one of the stowage spaces 21, 23, 25 demonstration equipment 39 may be provided that is, for example, used in the take-off phase. In addition, cover panels may be provided in the stowage spaces 21, 23, 25. The cover panels may enhance the aesthetic appearance of the cabin-attendant standing seat 21 and may be removed quickly and simply in an emergency.

Figure 9:
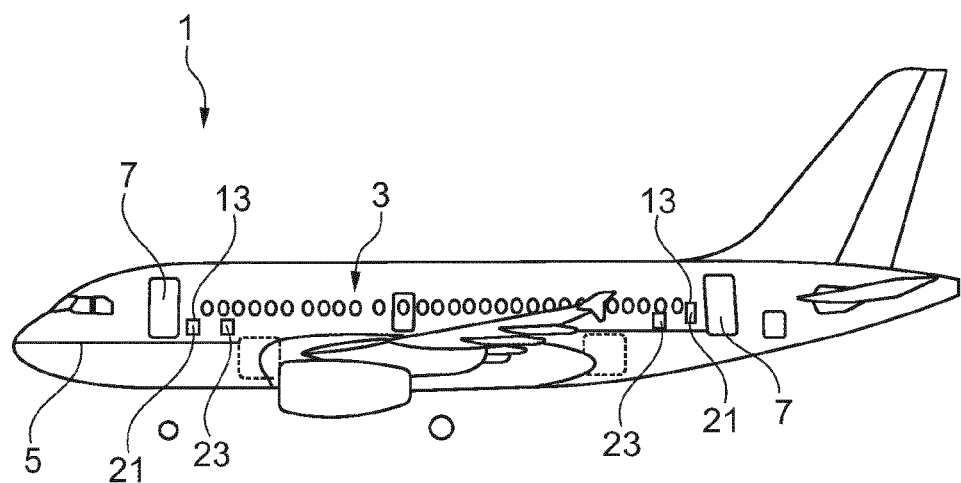
FIG. 9 shows a lateral view of an aircraft according to an exemplary embodiment of the present disclosure with a cabin-attendant standing seat.
Figure 10:
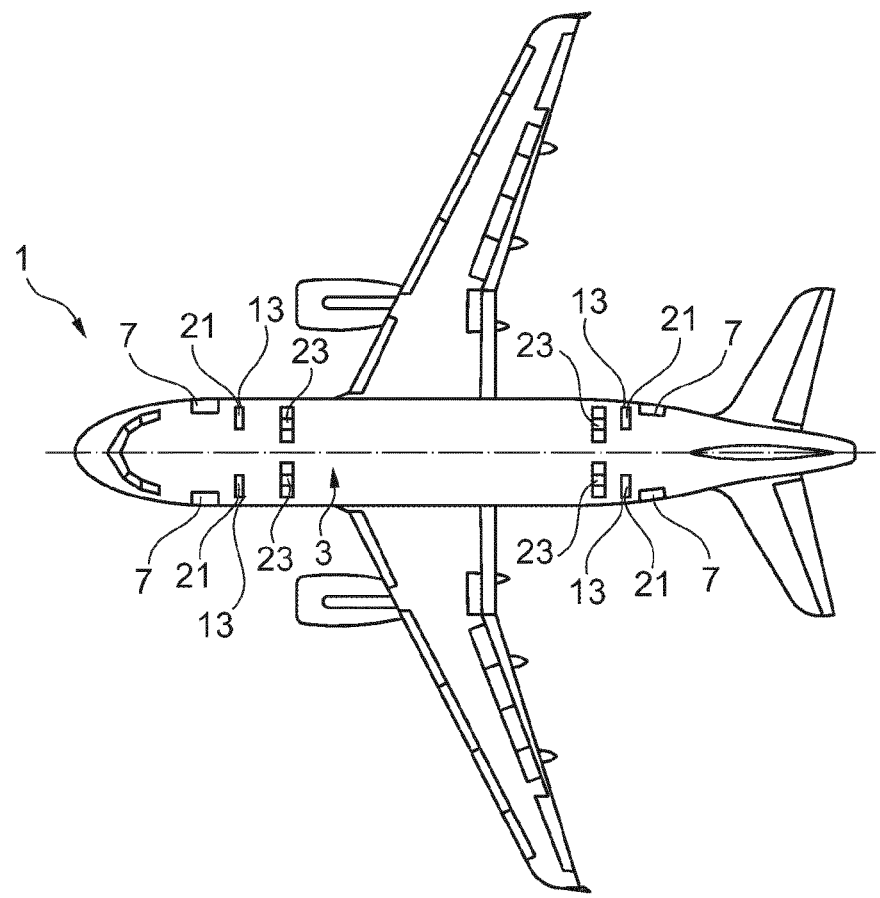
FIG. 10 shows a top view of an aircraft according to an exemplary embodiment of the present disclosure with a cabin-attendant standing seat.

FIGS. 9 and 10 show an aircraft 1, in particular an airplane, in which the cabin attendant seats 13 are designed as standing seats 21 in the region of aircraft exits 7, for example doors and emergency exits. Furthermore, passenger seats 23 in the cabin 3 of the aircraft 1 are diagrammatically shown.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft, comprising:
a cabin with an aircraft exit; and
a cabin attendant seat including a seating area and a backrest, the cabin attendant seat arranged in a region of the aircraft exit
wherein the cabin attendant seat is a non-folding standing seat; and
wherein the standing seat is arranged relative to the aircraft exit in such a manner that the aircraft exit is accessible when the non-foldable standing seat is not occupied; and
wherein the backrest comprises multiple stowage spaces,
wherein the standing seat further comprises a frame and the frame is designed to interconnect the seating area and the backrest;
wherein the frame is attached to a wall in the cabin near to the aircraft exit;
wherein a space is formed between the wall, the frame and the backrest for the multiple stowage places; and
wherein the multiple stowage places are accessible by pivoting the backrest through a joint that connects the backrest with the frame.

2. The aircraft of claim 1,
further comprising a plurality of passenger seats;
wherein the standing seat provides a higher seat position than the passenger seats.

3. The aircraft of claim 1,
wherein the seating area is height-adjustable relative to the backrest.

4. The aircraft of claim 1,
wherein the seating area encloses an angle with the backrest and the angle is variable by way of a further joint.

5. The aircraft of claim 1,
wherein the cabin comprises a cabin floor, and the seating area is inclined relative to the cabin floor.

6. The aircraft of claim 1,
wherein the cabin comprises a partition wall and the partition wall is arranged in the region of the aircraft exit.

7. The aircraft of claim 1,
wherein the standing seat comprises a first stowage space arranged between the backrest and the seating area.

8. An aircraft, comprising:
a cabin with an aircraft exit; and
a cabin attendant seat including a seating area and a backrest, the cabin attendant seat arranged in a region of the aircraft exit;
wherein the cabin attendant seat is a non-foldable standing seat; and
wherein the non-foldable standing seat is arranged relative to the aircraft exit in such a manner that the aircraft exit is accessible when the non-foldable standing seat is not occupied;
wherein the backrest comprises multiple stowage places;
wherein the frame is attached to a wall in the cabin near to the aircraft exit;
wherein a space is formed between the wall, the frame and the backrest for the multiple stowage places;
wherein the multiple stowage places are accessible by pivoting the backrest through a joint that connects the backrest with the frame.

9. The aircraft of claim 8,
further comprising a plurality of passenger seats;
wherein the standing seat provides a higher seat position than the passenger seats.

10. The aircraft of claim 8, wherein the seating area is height-adjustable relative to the backrest.

11. The aircraft of claim 8, wherein the seating area encloses an angle with the backrest and the angle is variable by way of a joint.

* * * * *